(12) United States Patent
Latschaw

(10) Patent No.: US 11,033,020 B2
(45) Date of Patent: Jun. 15, 2021

(54) RECIPROCATING DECOY MOVEMENT DEVICE

(71) Applicant: The Clone, LLC, Sherwood, OR (US)

(72) Inventor: Ron Latschaw, Lake Havasu City, AZ (US)

(73) Assignee: The Clone, LLC, Sherwood, OR (US)

( * ) Notice: Subject to any disclaimer, the term of this patent is extended or adjusted under 35 U.S.C. 154(b) by 245 days.

(21) Appl. No.: 16/372,329

(22) Filed: Apr. 1, 2019

(65) Prior Publication Data
US 2019/0297873 A1    Oct. 3, 2019

Related U.S. Application Data

(60) Provisional application No. 62/651,030, filed on Mar. 30, 2018.

(51) Int. Cl.
*A01M 31/06*    (2006.01)

(52) U.S. Cl.
CPC .................................. *A01M 31/06* (2013.01)

(58) Field of Classification Search
CPC ........ A01M 31/06; F16H 21/18; F16H 21/28; A01K 1/065
USPC ........... 43/26.1, 19.2, 3, 2; 40/218, 419, 423
See application file for complete search history.

(56) References Cited

U.S. PATENT DOCUMENTS

| | | | | |
|---|---|---|---|---|
| 3,839,810 A | * | 10/1974 | Lagasse | A01K 91/065 43/19.2 |
| 4,916,847 A | * | 4/1990 | Rusgo | A01K 91/065 43/19.2 |
| 5,540,010 A | * | 7/1996 | Aragona | A01K 91/065 43/19.2 |
| 5,570,534 A | * | 11/1996 | Ford | A01K 91/065 43/15 |
| 6,413,594 B1 | * | 7/2002 | Onishi | G09F 19/02 40/414 |
| 6,834,458 B1 | * | 12/2004 | Hand, III | A01M 31/06 43/2 |
| 7,043,865 B1 | * | 5/2006 | Crowe | A01M 31/04 43/3 |
| 7,082,710 B1 | * | 8/2006 | Jorgenson | A01M 31/06 43/2 |
| D613,641 S | | 4/2010 | Latschaw | |
| 8,151,512 B2 | | 4/2012 | Latschaw | |
| 8,230,638 B1 | * | 7/2012 | Dunaway | A01M 31/06 43/2 |
| 9,107,401 B1 | * | 8/2015 | Brajovic | A01M 31/06 |
| 9,474,267 B2 | * | 10/2016 | Rutledge | A01M 31/06 |
| 9,661,840 B1 | * | 5/2017 | Brain | A01M 31/06 |
| 10,194,653 B2 | | 2/2019 | Latschaw | |

(Continued)

*Primary Examiner* — Tien Q Dinh
*Assistant Examiner* — Zoe Tam Tran
(74) *Attorney, Agent, or Firm* — Brian Beverly; Beeson Skinner Beverly, LLP

(57) ABSTRACT

A reciprocating decoy movement device which has a swivel arm mounted on a pivot post extending upwardly from a base plate, and a drive bar rotatably mounted on a drive shaft extending upwardly from the base plate, the drive bar having an upwardly extending drive post slidably fitted in a guide channel disposed on the underside of the swivel arm, such that rotation of the drive bar moves the drive pin through a circle while sliding in the guide channel, thereby causing the swivel arm to move reciprocally from side-to-side.

15 Claims, 9 Drawing Sheets

(56) References Cited

U.S. PATENT DOCUMENTS

| | | | | |
|---|---|---|---|---|
| 2004/0250461 | A1* | 12/2004 | Dryer | A01M 31/06 43/2 |
| 2005/0160654 | A1* | 7/2005 | Cosciani | A01M 31/06 43/2 |
| 2009/0229164 | A1* | 9/2009 | Bradley | A01M 31/06 43/2 |
| 2009/0260274 | A1* | 10/2009 | Rogers | A01M 31/06 43/2 |
| 2012/0266516 | A1* | 10/2012 | White | A01K 97/01 43/4.5 |
| 2014/0245652 | A1* | 9/2014 | Franklin | A01M 31/06 43/2 |
| 2017/0099831 | A1* | 4/2017 | Bullerdick | A01M 31/06 |

* cited by examiner

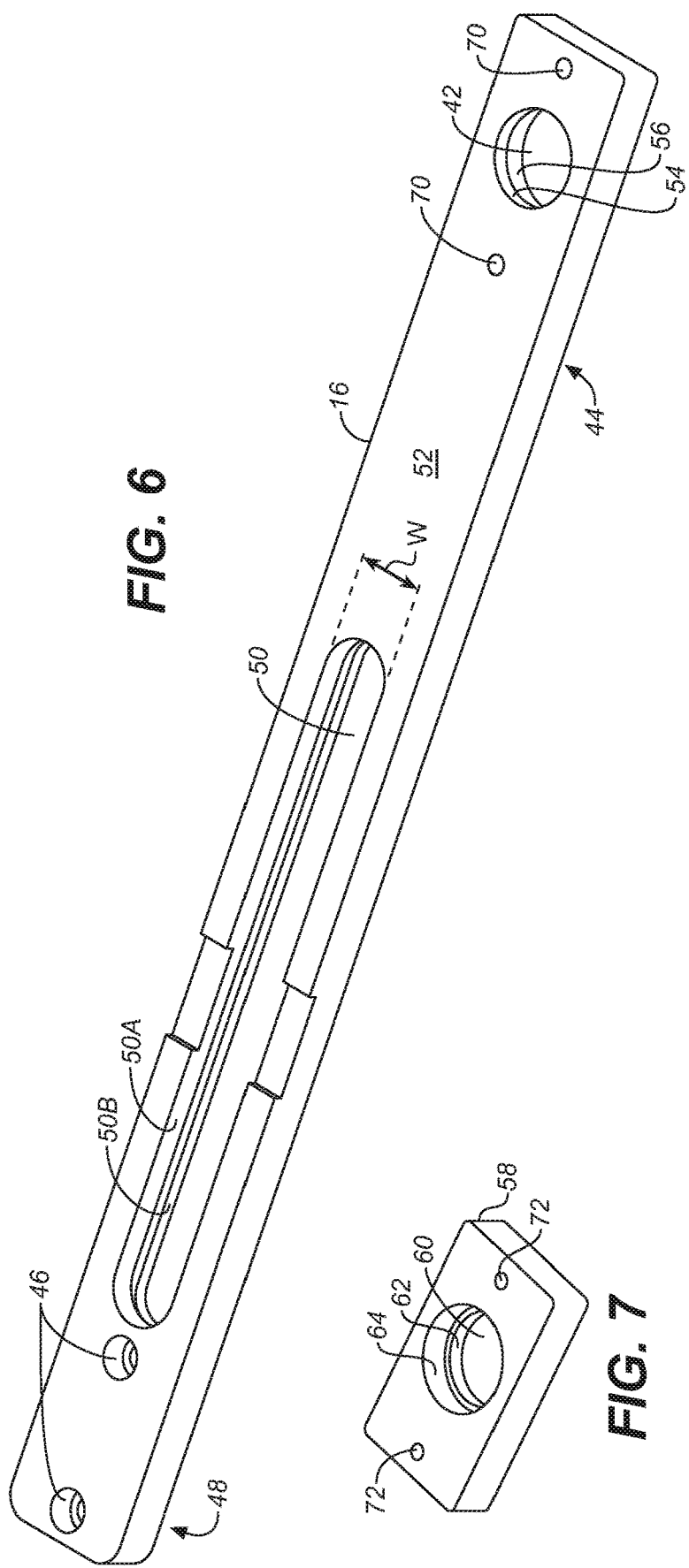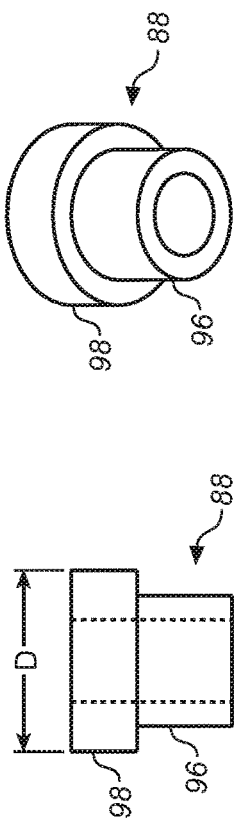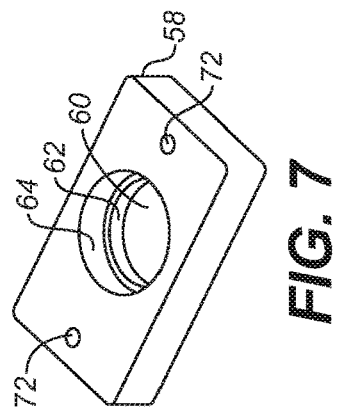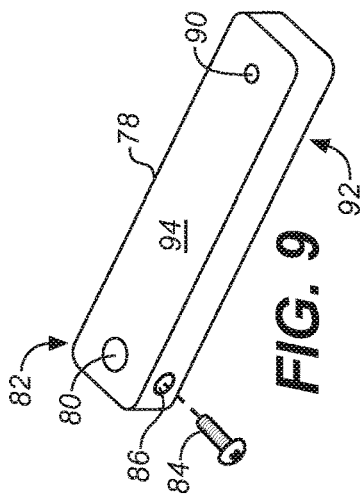

RECIPROCATING DECOY MOVEMENT DEVICE

CROSS-REFERENCE TO RELATED APPLICATIONS

This application claims the benefit of Application No. 62/651,030, filed Mar. 30, 2018.

BACKGROUND OF THE INVENTION

Field of the Invention

This invention is directed generally to devices for holding bird decoys and in particular to a device for moving a decoy repeatedly from side-to-side to resemble a flying bird in the process of landing.

Prior Art

Waterfowl decoys are commonly deployed while hunting waterfowl to lure waterfowl within range. Myriad attempts have been made to create waterfowl decoys that realistically emulate the appearance and action of live waterfowl. Several recent innovations provide decoys various types of wing movements which creates the illusion of the beating wings of a landing bird with varying degrees of success. Other decoys depend on wind to effect motions which simulate lifelike wing movements. Despite these efforts, heretofore it has proved to be difficult to simulate realistically the multiple and complex motions of a live waterfowl.

BRIEF DESCRIPTION OF THE ILLUSTRATIONS

FIG. 6 is an enlarged side elevational view of the device with the legs and rod holder truncated.

FIG. 7 is an upper perspective view of the swivel arm of the device.

FIG. 9 is an upper perspective view of the drive bar of the device.

FIGS. 10A and 10B are side elevational and upper perspective views, respectively, of the drive post of the device.

DESCRIPTION OF THE INVENTION

Figure 1:
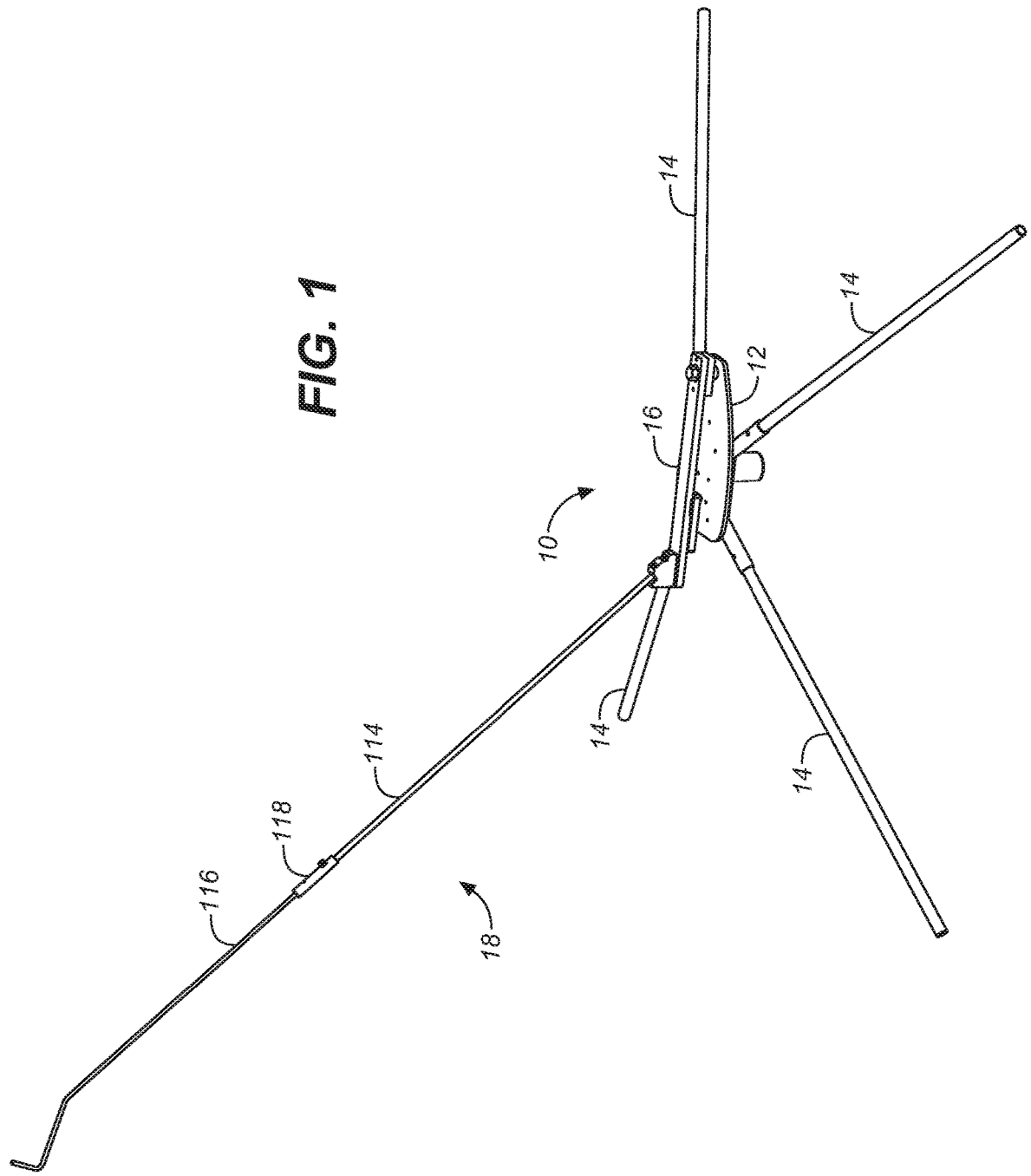
FIG. 1 is an upper left perspective view of a reciprocating decoy movement device according to the invention.

A reciprocating decoy movement device is depicted generally in FIG. 1 at numeral 10 and comprises a base plate 12 supported on four legs 14, a swivel arm 16 and a decoy support rod 18 extending forward from the swivel arm.

Figure 2:
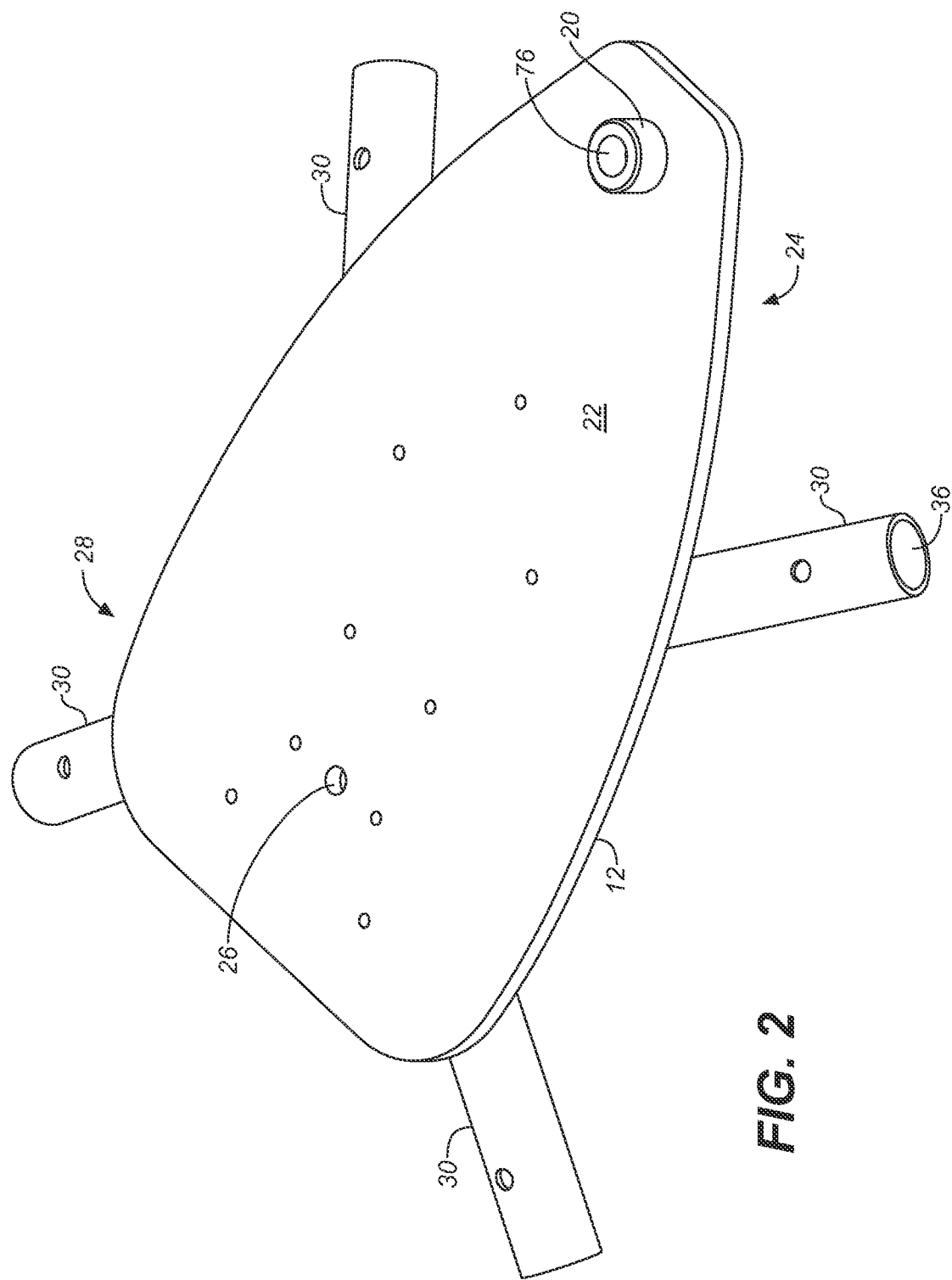
FIG. 2 is an upper left perspective view of the base plate, leg holder and pivot post assembly thereof.

With reference to FIG. 2, it is seen that a short cylindrical pivot post 20 extends upwardly from the top surface 22 at the back end 24 of the base plate 12, and a drive shaft aperture 26 is provided in the front end 28 of the base plate 12.

Figure 3A:
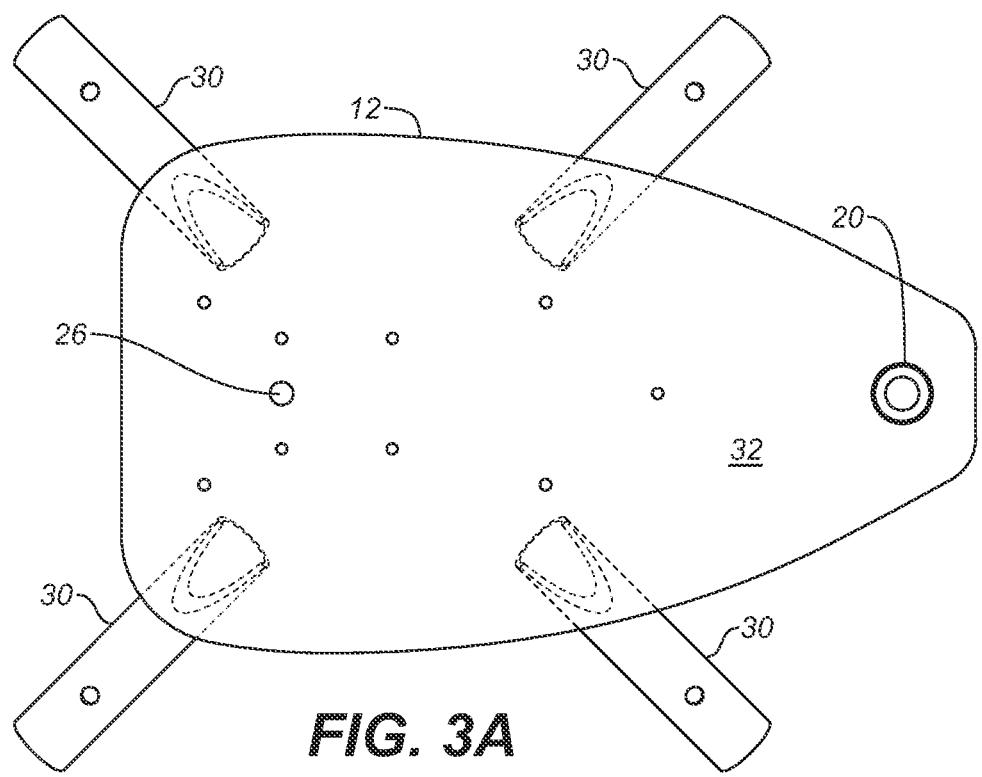
FIG. 3 is a bottom plan view of the base plate, leg holder and pivot post assembly shown in FIG. 2.
Figure 3B:
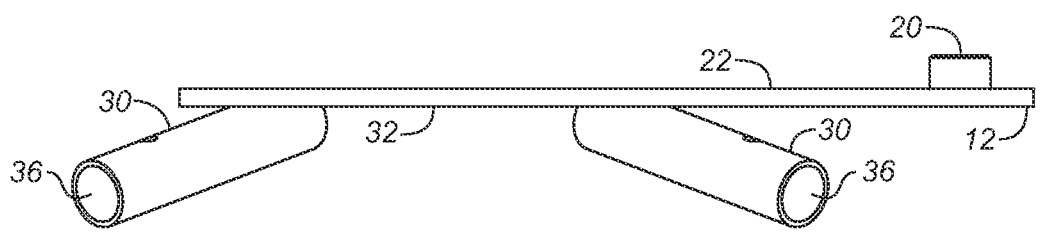
Figure 4:
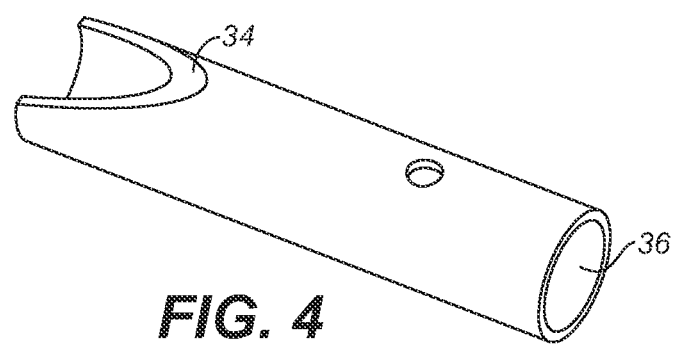
FIG. 4 is side elevational view thereof.

As shown in FIGS. 3A and 3B, four leg holders 30 extend angularly from the bottom surface 32 of the base plate. It can be seen in FIG. 4 that a portion of one end of each of the leg holders 30 is removed to form a parabolic attachment edge 34 that extends angularly to the length of each holder. The leg holders 30 are attached to the bottom surface 32 of the base plate 12 at the attachment edge 34 such that the leg holders 30 extend radially at a downward angle from the middle of the base plate 12 as shown.

Each leg holder 30 includes a longitudinally extending opening 36 sized to snugly receive legs 14 as seen in FIG. 1. Legs 14 are of a length that they provide a broad footing on which to support and stabilize the base plate 12.

Figure 5:
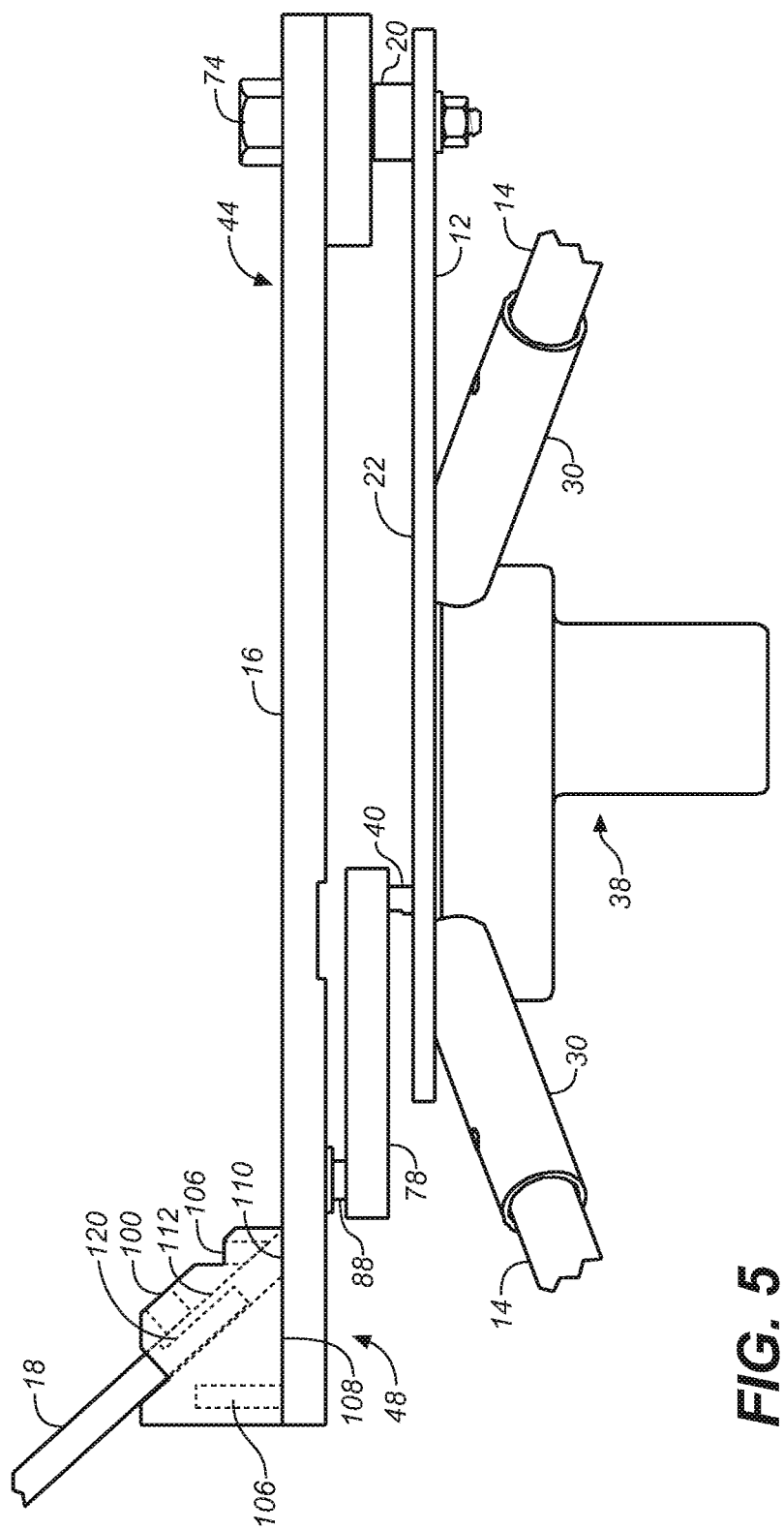
FIG. 5 is a perspective view of one of the leg holders of device.

A motor 38 is attached to the bottom of the base plate 12 as best seen in FIG. 5 and a drive shaft 40 operatively connected to the motor extends upwardly through the drive shaft aperture 26 (see FIGS. 2 and 3A and above the top surface 22 of the base plate.

Referring now to FIG. 6, a first pivot post hole 42 is provided in the back end 44 of swivel arm 16, two fastener apertures 46 are provided on the front end 48 thereof, and a guide channel 50 extends longitudinally in the underside 52 thereof as shown. The first pivot post hole 42 includes a small diameter section 54 and a large diameter section 56 having a diameter larger than the small diameter section 54 as shown.

The support block 58 shown in FIG. 7 comprises a second pivot post hole 60 which, like the first pivot post hole 42, also includes a small diameter section 62 and a large diameter section 64 having a diameter greater than the small diameter section 62 as shown. The small diameter sections 54, 62 of the swivel arm 16 and the support block 58 have equivalent diameters that are slightly larger than the diameter of pivot post 20. The large diameter sections 56, 64 of the swivel arm 16 and the support block 58 accommodate bushings (not shown) having an inner diameter equivalent to that of the small diameter sections 54, 62.

Figure 8:
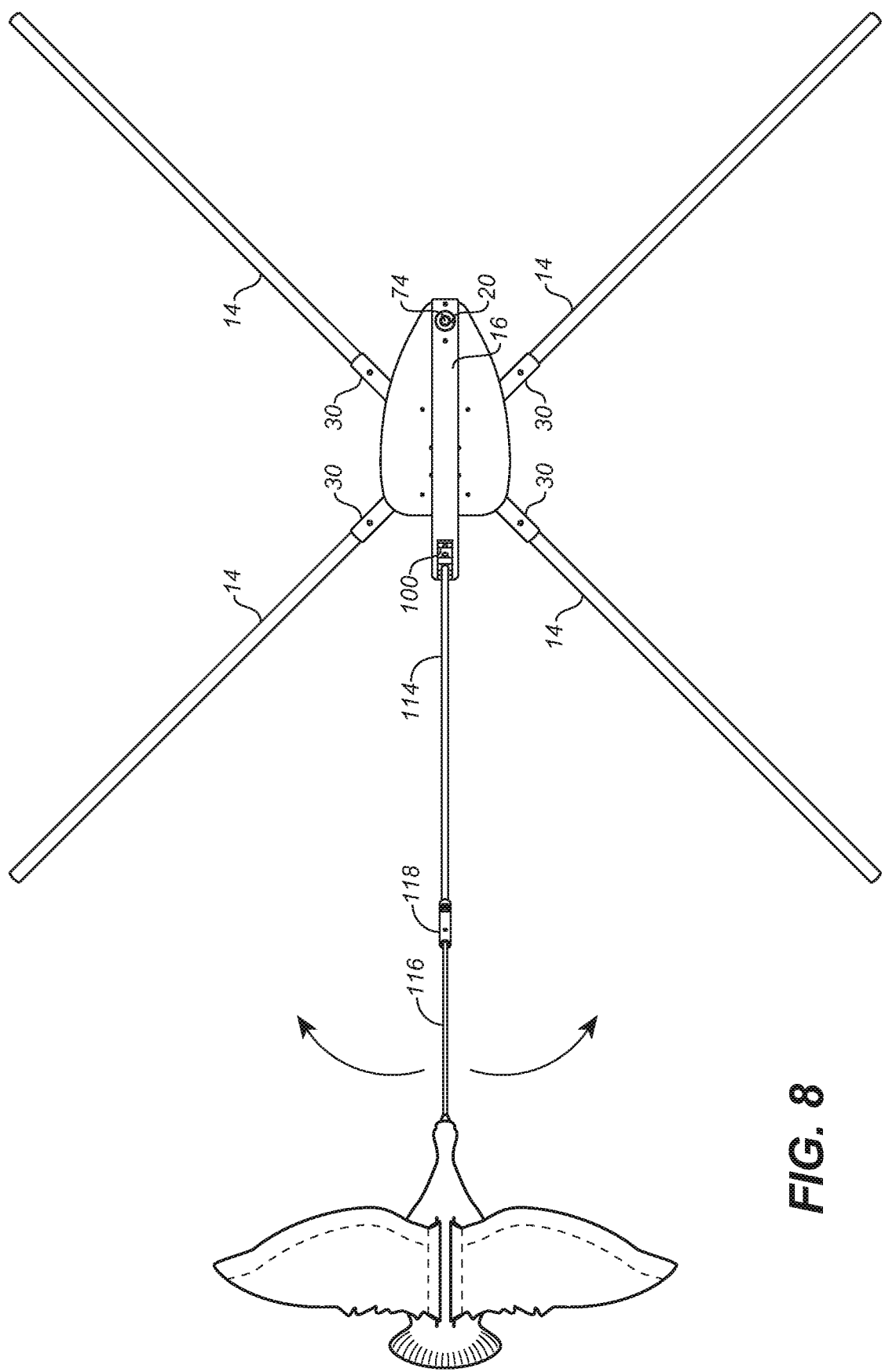
FIG. 8 is a top plan view of the device shown with an exemplary decoy mounted on the end of the decoy support rod.

With reference to FIGS. 1, 2 and 5-7, it is seen that support block 58 is secured to the back end 44 of swivel arm 16 with fasteners (not shown) inserted through fastener holes 70 in the swivel arm and into cooperating fastener holes 72 in support block so that first and second pivot post holes 42, 60 are concentrically aligned. The assembly is then positioned with pivot post 20 received in the pivot post holes 42, 60. A bolt 74 or similar fastener is inserted through bolt hole 76 (see FIG. 2) provided in the center of pivot post 20 to retain swivel arm 16, with support block 58, to base plate 1 so that the swivel arm 16 is free to swivel about pivot post 20 as seen in FIG. 8.

Referring now to FIG. 9, a drive bar 78 is shown which motivates the swivel arm 16 discussed above to swivel from side-to-side. A drive shaft opening 80 in the proximal end 82 of the drive bar 78 is securely fitted over the drive shaft 40 that extends upwardly from the base plate 12 and is rotationally fixed with a set screw 84 fastened in set screw hole 86. A drive post 88, shown in FIGS. 10A and 10B, is inserted into a drive post opening 90 provided on the distal end 92 of the drive bar 78 so that it extends upwardly from the top side 94 of the drive bar 78. The drive post 88 has a lower portion 96 that has a smaller diameter than its cylindrical upper portion 98. The upper portion 98 has a diameter D that is slightly less than the width W (see FIG. 6) of the guide channel 50 that is provided on the underside 52 of the swivel arm 16. When the swivel arm 16 is assembled onto the pivot post 20 as described above, the drive post 88 of the drive bar 78 can be slidably inserted into the guide channel 50 of the swivel arm 16 from below such that rotation of the drive bar 78 about the motor drive shaft 40, will cause the swivel arm 16 to swivel from side-to-side and the drive post 88 to travel back-and-forth longitudinally in the guide channel 50 as shown in FIG. 11A-11D. In one embodiment, guide channel 50 comprises two levels, a lower level 50A and an upper level 50B having a width greater than that of the lower level. The drive post 88 travels between the edges of upper level 50B in operation of the device, while the expanded width of the lower level 50A minimizes drag on the drive post 88. In another embodiment a bearing is provided toward the distal end 92 on the underside of the drive bar 78 which engages and rides on the top surface 22 of the base plate 12 in order to support the weighted distal end of the drive bar.

Figure 12:
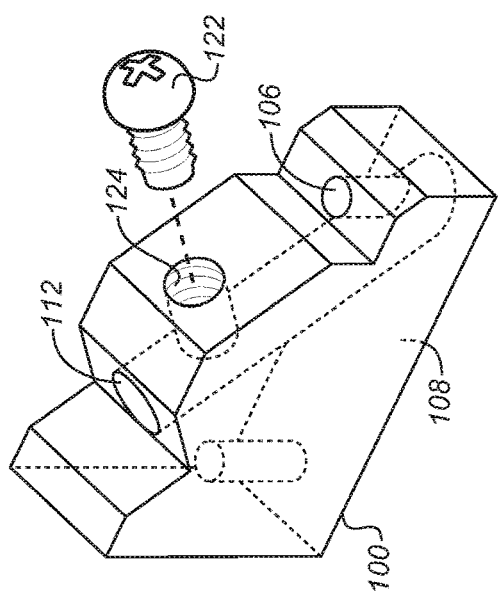
FIG. 12 is an upper perspective view of the rod holder of the device.

Referring again to FIGS. 1, 5 and 6, it is seen that a rod holder 100, shown enlarged in FIG. 12, is attached to front end 48 of the swivel arm 16 by fasteners inserted through fastener holes 46 in swivel arm 16 into cooperating fastener holes 106 in rod holder 100 such that the bottom side 108 of the rod holder 100 is flush with the top surface 110 of swivel arm 16. A rod aperture 112 extends into the rod holder 100 at an angle of approximately 45° to the bottom side 108 such that a support rod 18 received therein extends forward and upward from the front end 48 of the swivel arm 16 as shown.

Figure 13:
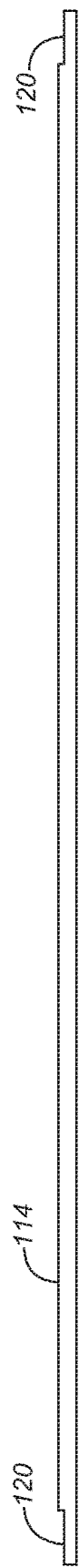
FIG. 13 is a side elevational view of the lower part of the decoy support rod thereof.
Figure 14:
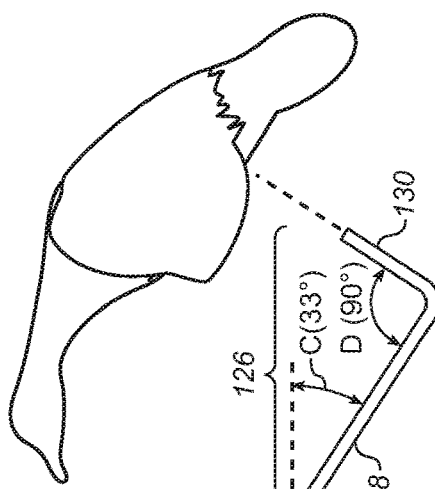
FIG. 14 is a side elevational view of the upper part of the decoy support rod.

As seen in FIG. 1, the decoy support rod 18 in the illustrated embodiment comprises a lower part 114, shown in FIG. 13, and an upper part 116, shown in FIG. 14, the upper part including a ferrule 118. An axially extending planar surface 120 is provided at each end of the lower part 114 as seen in FIG. 13, the planar surface 120 on each end having the same tangential orientation to the axial dimension of the lower part as the other end. The lower part 114 is securely retained in rod aperture 112 and prevented from rotating in rod aperture 112 by fastening set screw 122 in set screw hole 124 against planar surface 120.

As seen in FIG. 14, a decoy hook 126 is provided at the distal end of the upper part 116 of support rod 18. Hook 126 includes a decoy supporting segment 128 and a decoy engaging segment 130. The decoy supporting segment 128 is bent at an angle C of approximately 33° to the main segment 132 of upper part 116, and the decoy engaging segment 130 is bent in the opposite direction at an angle of approximately 90° to the decoy supporting segment 128. The decoy supporting segment 128 is for insertion in a retaining hole in the lower surface of a decoy. The decoy supporting segment 128 is for engaging the lower surface of the decoy when it is hooked onto the decoy engaging segment 130. Ferrule 118 is attached to the proximal end of upper part 116 with the ferrule's set screw holes 134 oriented in the same upward direction as the decoy engaging segment 130. In one embodiment, the ferrule is permanently fastened to the proximal end, as by welding, to ensure that the lowermost of the set screw holes 134 is oriented in the same direction as the decoy engaging segment 130.

The upper part 116 of decoy support rod 18 is attached to the lower part 114 thereof by fitting the lower end of ferrule 118 over the upper end of lower part 114 and tightening set screw 136 until it engages the planar surface 120 on the upper end of the lower part 114. The upper part 116 of the support rod 18 is thereby rotationally locked with respect to the lower part 114 with the decoy engaging segment 130 oriented upward.

The lower and upper parts 114, 116 of the decoy support rod 18 comprise materials having enough flexibility that, when a decoy is loaded onto the hook 126, the decoy support rod bends so that the decoy supporting segment 128 of the hook 126 is oriented at or slightly above horizontal. In one embodiment, the lower part 114 of the support rod is stronger and less flexible than the upper part 116.

Figure 11A:
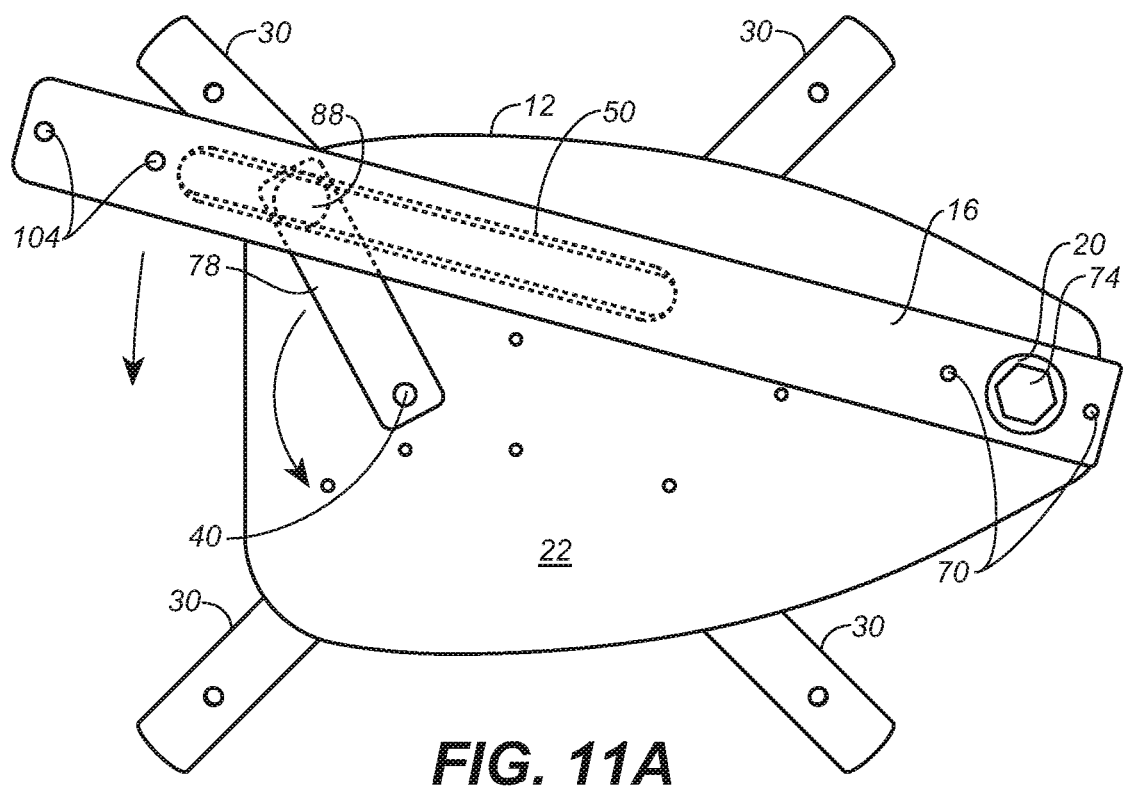
FIGS. 11A-11D are upper plan views showing movement of the swivel arm and drive bar relative to the base plate of the device.
Figure 11B:
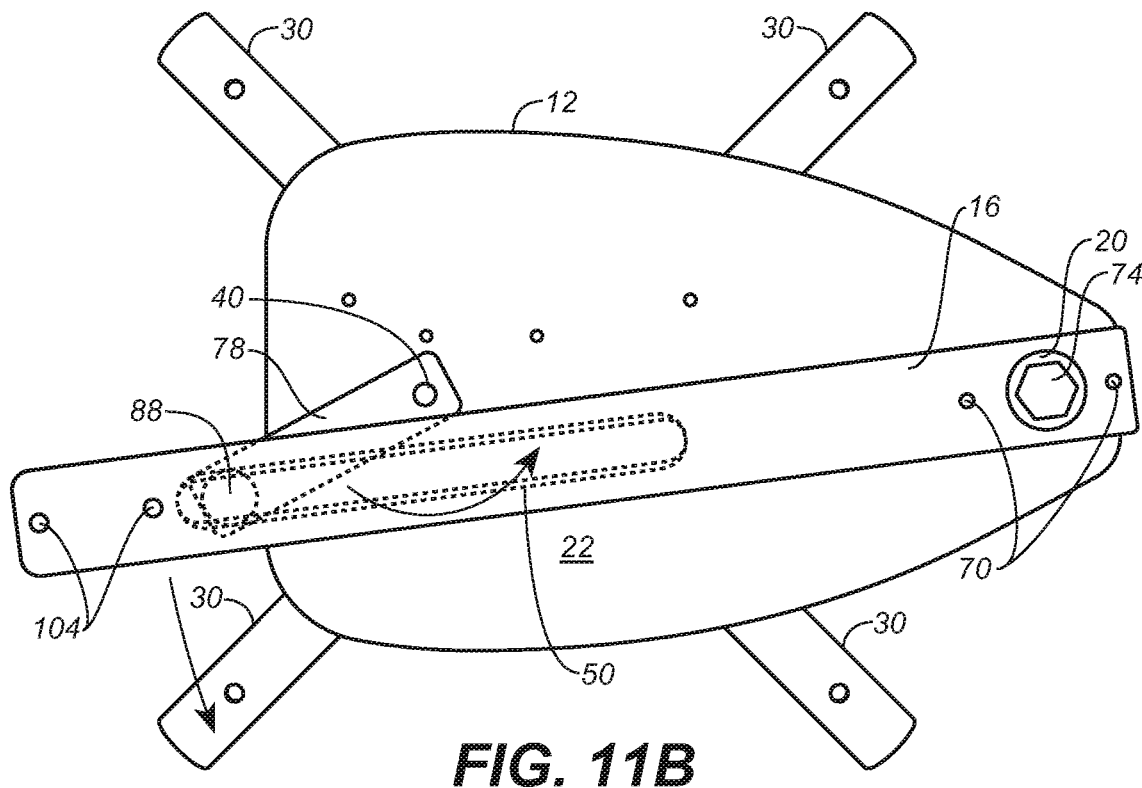
Figure 11C:
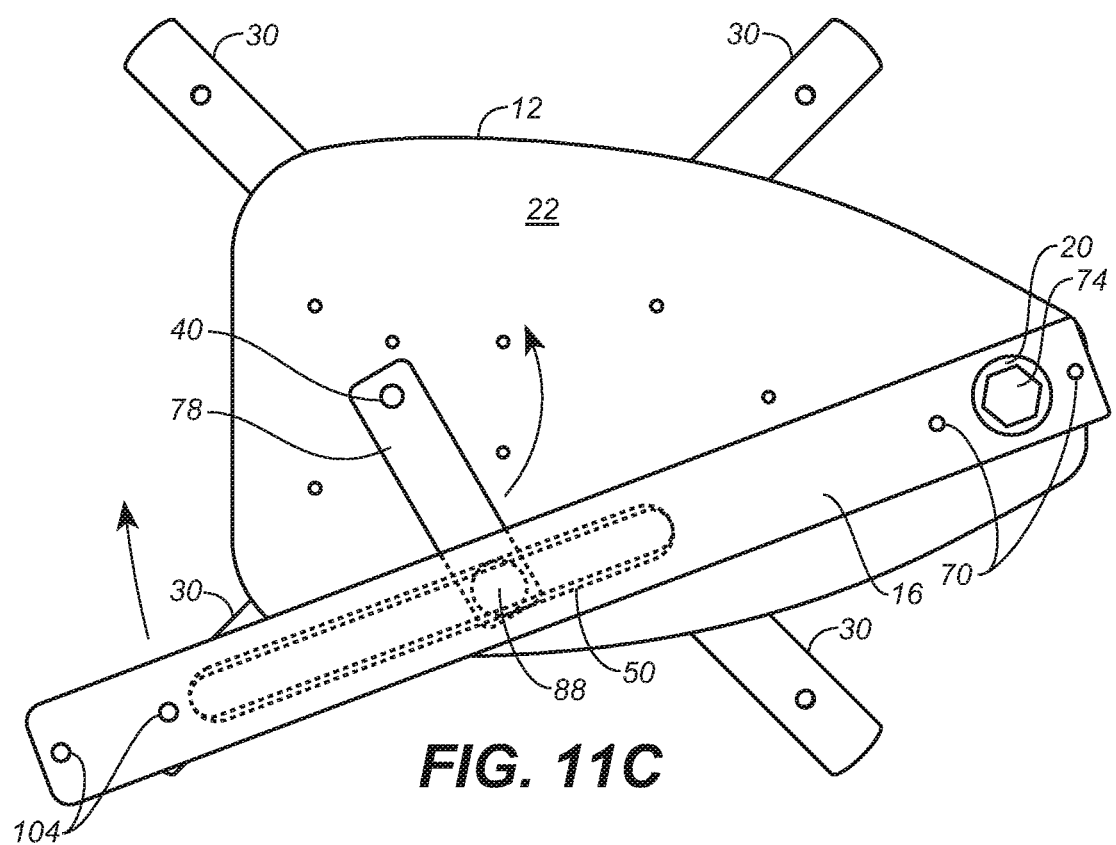
Figure 11D:
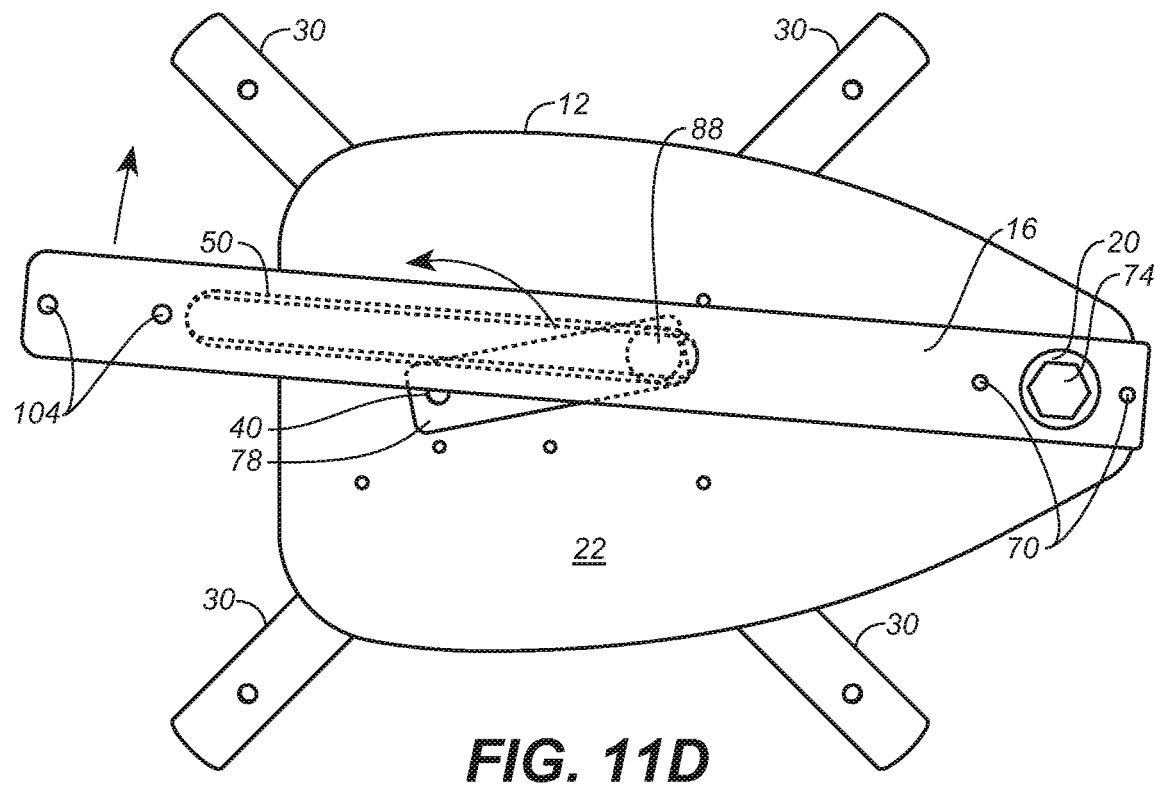

Activation of motor 38 causes drive shaft 40 to spin, thereby rotating drive bar 78 which in turn causes swivel arm 16 to swivel reciprocally about pivot post 20 as shown in FIGS. 8 and 11A-11B. A decoy mounted on the hook 126 of the decoy support rod 18 is thereby made to move from side-to-side while simultaneously the flexibility of the support rod 18 causes the decoy to bounce up and down. The combined swiveling and bouncing movements create a remarkably lifelike impression of a waterfowl in the process of landing. In one embodiment of the device different upper parts 116 of the decoy support rod 18 are provided, each having a unique amount of flexibility, in order to allow the user to gear the flexibility of the device to the weight of the decoy being deployed and prevailing field conditions.

There have thus been described and illustrated certain embodiments of a reciprocating decoy movement device according to the invention. Although the present invention has been described and illustrated in detail, it should be clearly understood that the disclosure is illustrative only and is not to be taken as limiting.

I claim:

1. A reciprocating decoy movement device comprising:
a base plate having a top face, a front end, and a back end,
a pivot post extending upwardly from the top face at the back end thereof,
a drive shaft extending upwardly from the top face of the base plate,
a swivel arm having a front end and an underside, the swivel arm attached to the pivot post and movable about a pivot axis perpendicular to the base plate formed by said pivot post, the underside of the swivel arm having a linear guide channel extending radially from the pivot axis,
a drive bar having a top side, a proximal end and a distal end, the proximal end having a drive shaft opening, the distal end having a drive post opening, the drive shaft received in the drive shaft opening,
a drive post received in the drive post opening of the drive bar, the drive post extending upwardly from the top side of the drive bar and slidably received in the guide channel of the swivel arm, and
a rod holder attached to the front end of the swivel arm for supporting a decoy,
whereby spinning the drive shaft rotates the drive bar, causing the swivel arm to swivel reciprocally about the pivot axis and causing the drive post to travel in the guide channel, so that a decoy supported by the holder is moved reciprocally from side-to-side.

2. The reciprocating decoy movement device of claim 1 further comprising:
a drive shaft aperture disposed in the front end of the base plate,
the drive shaft freely received in the drive shaft aperture, and
a motor connected to the base plate and operatively connected to the motor such that activation of the motor causes the drive shaft to spin.

3. The reciprocating decoy movement device of claim 1 further comprising:
a support rod attached to the holder for supporting a decoy.

4. The reciprocating decoy movement device of claim 1 further comprising:
the support rod extending forward from the holder so that a decoy supported by the support rod is horizontally spaced forward of the front end of the base plate.

5. The reciprocating decoy movement device of claim 1 further comprising:
the swivel arm having a back end including a first pivot post hole, and
a support block having a second pivot post hole, the support block attached to the underside of the swivel arm so that the post holes of the arm and of the support block are concentrically aligned, the pivot post closely received in the post holes so that the arm and support block are moveable about said pivot axis.

6. The reciprocating decoy movement device of claim 1 further comprising:
the rod holder having a rod aperture, the support rod received in the rod aperture.

7. The reciprocating decoy movement device of claim 1 further comprising:
the swivel arm having a top side, and
the rod holder is attached to the top side of the swivel arm.

8. The reciprocating decoy movement device of claim 1 further comprising:
the support rod including an upper part and a lower part connected to the lower part, the upper part rotationally fixed to the lower part, the lower part attached to and rotationally fixed to the rod holder.

9. The reciprocating decoy movement device of claim 8 further comprising:
each end of the lower part having an axially extending planar surface, the planar surface on each end having the same tangential orientation to the axial dimension of the lower part as the other end.

10. The reciprocating decoy movement device of claim 9 wherein:
the lower part is connected to the upper part by a ferrule, the ferrule having a set screw which when tightened engages the planar surface on one end of the lower part.

11. The reciprocating decoy movement device of claim 10 wherein:
the rod holder includes a set screw which when tightened engages the planar surface on the other end of the lower part.

12. The reciprocating decoy movement device of claim 8 further comprising:
the upper part more flexible than the lower part.

13. The reciprocating decoy movement device of claim 1 further comprising:
a motor operatively connected to the drive shaft such that activation of the motor causes the drive shaft to spin.

14. The reciprocating decoy movement device of claim 1 further comprising:
the guide channel having a lower level and an upper level, the lower level adjacent the underside of the swivel arm, the lower level disposed between said underside and the upper level, the upper level having a width greater than that of the lower level for minimizing drag of the drive post while traveling in the guide channel.

15. A reciprocating decoy movement device comprises:
a base plate having a top face, a front end, and a back end, a pivot post extending upwardly from the top face at the back end thereof, and a drive shaft aperture disposed in the front end,
a drive shaft freely received in the drive shaft aperture and extending upwardly from the top face of the base plate,
a swivel arm having a front end and an underside, the swivel arm attached to the pivot post and movable about a pivot axis perpendicular to the base plate formed by said pivot post, the underside of the swivel arm having a linear guide channel extending radially from the pivot axis,
a drive bar having a top side, a proximal end and a distal end, the proximal end having a drive shaft opening, the distal end having a drive post opening, the drive shaft received in the drive shaft opening,
a drive post received in the drive post opening of the drive bar, the drive post extending upwardly from the top side of the drive bar and slidably received in the guide channel of the swivel arm,
a rod holder attached to the front end of the swivel arm, and
a support rod attached to the holder and extending forward of the front end of the base plate for supporting a decoy, the support rod including are upper part and a lower part, the upper part rotationally fixed to the lower part, the lower part attached to and rotationally fixed to the rod holder,
whereby spinning the drive shaft rotates the drive bar, causing the swivel arm to swivel reciprocally about the pivot axis and causing the drive post to travel in the guide channel, so that a decoy supported by the holder is moved reciprocally from side-to-side.

* * * * *